(12) United States Patent
Jacobson

(10) Patent No.: US 6,206,178 B1
(45) Date of Patent: Mar. 27, 2001

(54) CARRIER AND DISCHARGING SYSTEM FOR HANGERS

(75) Inventor: Carl Magnus Jacobson, Borås (SE)

(73) Assignee: Jensen Sweden AB (SE)

( * ) Notice: Subject to any disclaimer, the term of this patent is extended or adjusted under 35 U.S.C. 154(b) by 0 days.

(21) Appl. No.: 09/424,382

(22) PCT Filed: May 26, 1998

(86) PCT No.: PCT/SE98/00982

§ 371 Date: Jan. 20, 2000

§ 102(e) Date: Jan. 20, 2000

(87) PCT Pub. No.: WO98/54075

PCT Pub. Date: Dec. 3, 1998

(30) Foreign Application Priority Data

May 26, 1997 (SE) .................................. 9701995

(51) Int. Cl.$^7$ .................................. B65G 17/32
(52) U.S. Cl. .......................... 198/680; 198/465.4
(58) Field of Search ................. 198/465.4, 680

(56) References Cited

U.S. PATENT DOCUMENTS 1,998,109 * 4/1935 Walter, Jr. .
4,907,699 * 3/1990 Butcher et al. ................. 209/3.3
5,975,279 * 11/1999 Blattner et al. ................. 198/459.4

FOREIGN PATENT DOCUMENTS 0 566 553 B1  10/1993 (EP) .

* cited by examiner

Primary Examiner—Christopher P. Ellis
Assistant Examiner—Richard Ridley
(74) Attorney, Agent, or Firm—Lerner, David, Littenberg, Krumholz & Mentlik, LLP

(57) ABSTRACT

Apparatus is disclosed for carrying and unloading hangers from a first conveyor to a second conveyor including a carrier mounted on the first conveyor so that a hanger hook can be mounted on the carrier, the carrier including a disc having a normally upper surface eccentrically and swingably mounted with respect to the first conveyor, the normally upper surface of the disc including a groove for the hanger hook, and a wedge mounted adjacent to the first conveyor whereby when the carrier passes adjacent to the wedge, the carrier is caused to swing upwardly displacing the normally upper surface of the disc downwardly and causing the hanger hook to fall out of the groove so that it can be transferred to the second conveyor.

4 Claims, 2 Drawing Sheets

CARRIER AND DISCHARGING SYSTEM FOR HANGERS

FIELD OF THE INVENTION

The present invention relates to a carrier and an unloading system for clothes hangers which are intended to be transported from a first running conveyor to a second running conveyor. The present invention more particularly relates to such conveyors which are commonly used in, for example, laundries where the garments are hung up on clothes hangers at a hanging station and are then moved up to a main conveyor to which the clothes hangers with the garments are transferred for further transport and treatment. These garments are normally hung in a hanging station at a height adapted for a human being, and are thereafter transported up to a higher level for further transport.

BACKGROUND OF THE INVENTION

A hanging station of the type described above is disclosed, for example, in European Patent No. 0,566,553. This hanging station, which can be regulated in height according to the height of the operator, comprises an endless chain having a number of carriers on which the clothes hangers are hung up automatically. These carriers are made in the form of a pin which is mounted in the conveyor chain and which has head or flange on the free end thereof. The hangers are usually fed automatically into the hanging station where they are hung up one by one on separate carriers, whereupon the garments are hung upon the empty hangers at a certain level. After hanging the garments on the hangers the conveyor, which has been stopped at the hanging station, is again started and moves the hanger with the garment, usually upwards to a main conveyor. To ensure that the hanger is transferred to the new conveyor, some transferring mechanism, for example in the form of a wedge, has been arranged which forces the hanger hook over the free end of the pin where the head of the flange is located, and from there the hanger falls down onto a new transport track.

The carriers according to the prior art as described above are rigidly anchored on the conveyor chain and the hanger hooks must, as mentioned above, be forced over the flange or the head to be removed. This means that both the hangers, and more particularly the supporting carrier, are subjected to very heavy wear. This is particularly the case with the flange or the head on the pin-shaped carrier. This may lead to the flange or head decreasing so much that they no longer safely prevent the hanger hook from unintentionally sliding over this hindrance and falling down. It is therefore necessary to repair or exchange these carriers from time to time.

SUMMARY OF THE INVENTION

In accordance with the present invention, this and other problems have been overcome by the discovery of apparatus for carrying and unloading hangers from a first movable conveyor to a second movable conveyor comprising a carrier mounted with respect to the first movable conveyor, whereby a hanger hook can be mounted on the carrier, the carrier comprising a disc having a normally upper surface eccentrically and swingably mounted with respect to the first movable conveyor, the normally upper surface of the disc including a groove for the hanger hook, and a wedge mounted adjacent to the first movable conveyor, whereby when the carrier passes adjacent to the wedge the carrier is caused to swing upwardly displacing the normally upper surface of the disc downwardly and causing the hanger hook to fall out of the groove so that it can be transferred to the second movable conveyor. Preferably the groove comprises an arc-shaped groove.

In accordance with one embodiment of the apparatus of the present invention, the disc comprises a first disc and the carrier includes a second disc joined to the first disc, the second disc being larger than the first disc and being suspended from the first movable conveyor and the first disc including the groove for the hanger hook. In a preferred embodiment, the first movable conveyor comprises a conveyor chain, and the second disc is suspended from the conveyor chain.

In order to solve the above problems, a carrier and unloading system for clothes hangers has been invented, which is intended to be transported hanging in the hanger hook from the first running conveyor and to be transferred to a second running conveyor, in which system the carrier on which the hanger hook is intended to hang in the first conveyor consists of a preferably circular disc which is eccentrically and swingably suspended from the conveyor in a plane parallel with the conveyor band (chain) and which on its upper side is provided with an arc-shaped groove for the hanger hook, and an unloading wedge arranged close to the track which, when the carrier passes it, swings the carrier up so that the hanger falls out of the groove.

According to the present invention, it is suitable that the carrier disc consists of two joined discs of different size wherein the larger one is swingably suspended in the transport band (chain) and the smaller one is provided with the groove for the hanger hook.

BRIEF DESCRIPTION OF THE FIGURES

The present invention will be described in more detail in the following detailed description, with reference to the enclosed drawings, in which.

DETAILED DESCRIPTION

Figure 1:
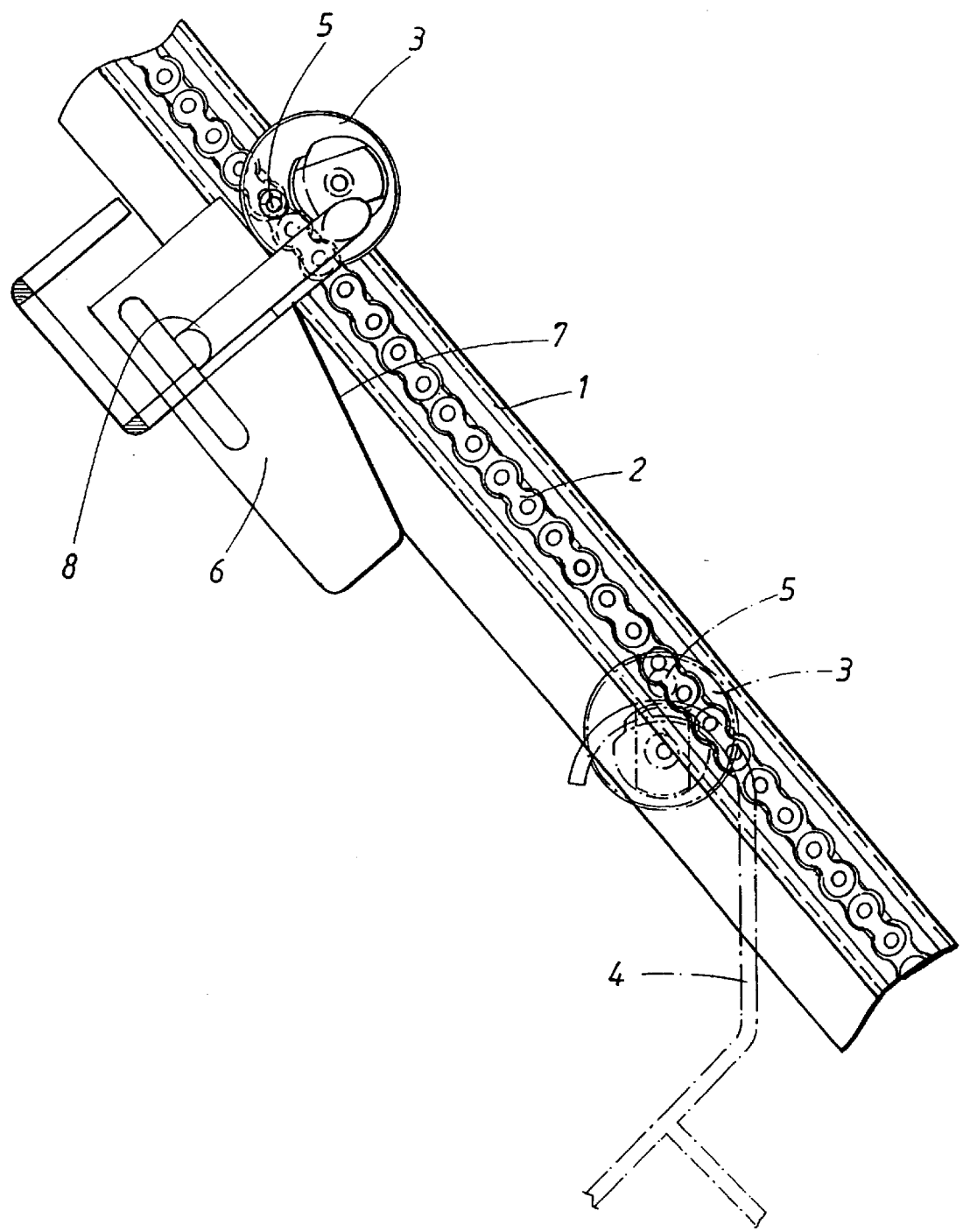
FIG. 1 is a side, elevational, partial view of a conveyor with carriers, with a hanger hook shown in phantom therein.

Referring to the Figures, in which like reference numerals refer to like elements thereof, FIG. 1 shows an upwardly feeding rail 1, which could be a horizontal or downwardly sloping rail, in which a conveyor chain 2 is arranged. For the sake of simplicity, this conveyor chain 2 is only partially shown. Instead of a chain 2, a band or the like may be arranged. Furthermore, the track 1 does not need to be constructed in the precise manner shown.

On the chain 2 carriers 3 are suspended. Two of these carriers are shown in the drawing and the lower one in the drawing, as is shown in phantom view, has been provided with a hanger hook. The carriers 3 are in this case disc shaped and circular. They may, however, have some other form, for example oval, but a circular disc-shaped design is preferred.

The carrier 3 is swingably suspended on a shaft 5 which is eccentrically arranged such that the carrier 3 hangs downwardly from it.

The other carrier 3 which is shown in the figure has reached a higher level on the rail 1 where it meets an unloading wedge 6. This unloading wedge 6, which has an oblique upper surface 7 against which the carrier 3 will slide, forces the carrier 3 to an upwardly swung position, as shown in the Figure. The hanger hook 4 will then come out of its groove and fall downwardly onto another unloading arrangement 8 which is the first step on the second running conveyor. The unloading arrangement 8 and the second conveyor are of a conventional type, and will therefore not be described in more detail here.

Figure 2:
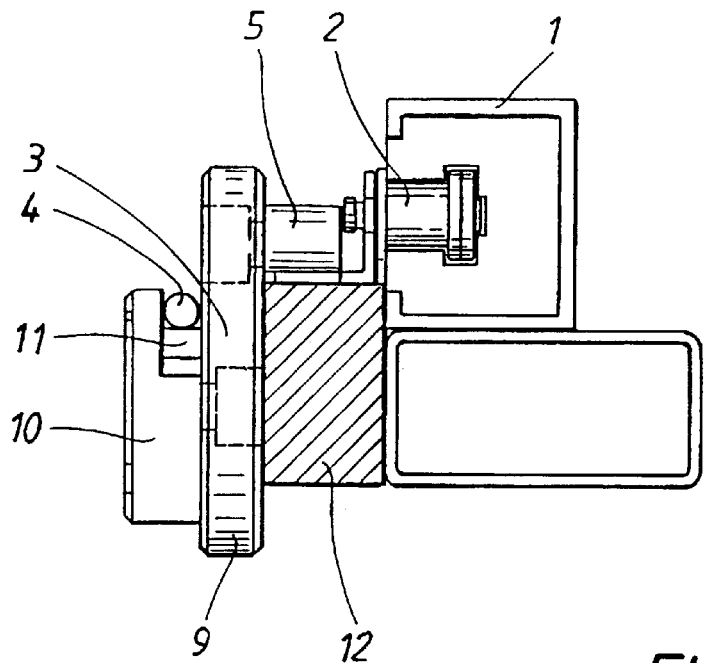
FIG. 2 is a rear, elevational, partially sectional view through the conveyor in the direction of movement thereof.

FIG. 2 shows a sectional view through the track 1 with mounted carriers 3. As appears from this Figure the carrier 3 is composed of two discs, 9 and 10, which are rigidly screwed together. The arc-formed groove 11 for the hanger hook 4 is, as appears from the Figure arranged on the upper side of the disc 10. When this disc is turned up, the hanger hook 4 will slide out from its groove and over to the smooth surface of the disc 10 and will fall down therefrom. The smooth portion of the surface of the disc 10 may be made somewhat sloping so that the hanger hook 4 falls off more easily. It is also not necessary that the disc 10 consist of an actual disc. Instead, it can be somewhat thicker and have a conical narrowing shape outwardly in the form of some kind of a stud. It is most practical, however, not to have any protruding element on the carrier 3.

Figure 3:
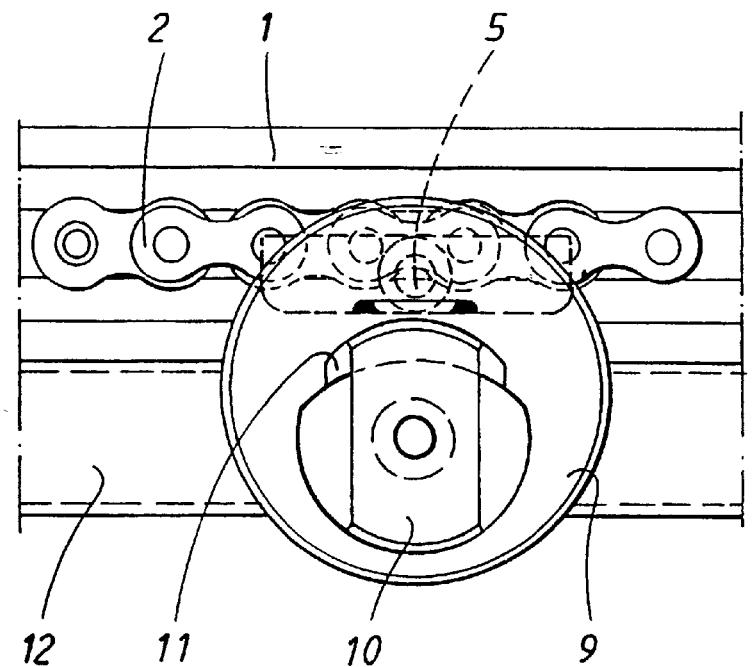
FIG. 3 is a side, elevational, partial view of a carrier without a hanger hook and a portion of the conveyor.

In FIG. 3 a list 12 is also shown which lies near the carrier 3. This list is preferably made of plastic having a low friction surface, since the carrier must slide against it and be supported by the list.

FIG. 3 shows the same arrangement as in FIG. 2, but in this case as seen from the side. The reference numerals which are present in FIG. 3 refer to the same elements as in FIG. 2.

By means of the present invention a carrier and unloading system, which is simple, economically advantageous and above all safely operable since it is not subjected to any substantial wear, has been brought about.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Apparatus for carrying and transferring hangers from a first movable conveyor to a second movable conveyor comprising a carrier mounted with respect to said first movable conveyor, said carrier comprising a disc having a normally upper surface eccentrically and swingably mounted with respect to said first movable conveyor, said normally upper surface of said disc including a groove adapted for receiving hanger hook, and a wedge mounted adjacent to said first movable conveyor, wherein when said carrier engaged on passes adjacent to said wedge said carrier is caused to swing upwardly displacing said normally upper surface of said disc downwardly and causing said hanger hook to fall out of said groove thereby transferring said hanger hook to said second movable conveyor.

2. The apparatus of claim 1 wherein said groove comprises an arc-shaped groove.

3. The apparatus of claim 1, wherein said disc comprises a first disc and wherein said carrier includes a second disc joined to said first disc, said second disc being larger than said first disc and being suspended from said first movable conveyor and said first disc including said groove for said hanger hook.

4. The apparatus of claim 3, wherein said first movable conveyor comprises a conveyor chain, and wherein said second disc is suspended from said conveyor chain.

* * * * *

UNITED STATES PATENT AND TRADEMARK OFFICE
CERTIFICATE OF CORRECTION

PATENT NO. : 6,206,178 B1  Page 1 of 1
DATED : March 27, 2001
INVENTOR(S) : Carl Magnus Jacobson It is certified that error appears in the above-identified patent and that said Letters Patent is hereby corrected as shown below:

Title page,
§371 Date: delete "Jan. 20, 2000" and insert therefore -- Feb. 9, 2000 --.
§102(e) Date: delete "Jan. 20, 2000" and insert therefore -- Feb. 9, 2000 --.

Column 1,
Line 26, after "has" insert -- a --.

Column 4,
Line 19, "engaged on" should read -- engages and --.

Signed and Sealed this

Sixteenth Day of October, 2001

*Attest:*

*Attesting Officer*

NICHOLAS P. GODICI
*Acting Director of the United States Patent and Trademark Office*